(12) United States Patent
Mead et al.

(10) Patent No.: X7933
(45) Date of Patent: Dec. 31, 1833

(54) LATHS, CUTTING

(76) Inventors: James Mead; Aaron W. Pierson, executor for Wyllis Pierson, deceased

United States Patent Patent No.: X7933

James Mead, & Aaron W. Pierson. Ext. of Wyllis Pierson Decd

Letters Patent.

The Schedule referred to in these Letters Patent, and making part of the same, containing a description in the words of the said James Mead, and Aaron W. Pierson, Executor of the late Wyllis Pierson, deceased, themselves of their improvement in the "Lath cutting Machine"

To all to whom these presents shall come; greeting.
Be it known that I, James Mead, of Lebanon, in Warren County and State of Ohio, together with Wyllis Pierson long now deceased but late of said County, had in the lifetime of said Wyllis, invented a new and useful improvement in the "Lath cutting Machine," and that the following is a full and exact description of the construction and operation of said Machine, as invented by me, and the said Wyllis Pierson, deceased. The Machine is constructed with two upright fender posts which are connected at a suitable height by a substantial tie or brace. On the back part of each post and opposite to said tie or brace is placed a permanent arm designed to serve as a fulcrum, and to each of these arms is attached a Lever with the longer end upwards — At a proper distance above said tie or brace is a double crank each end of which is in one of the fender posts, and is regulated at one end by a balance wheel. At or near each end of said crank are attached two pitmen. One of said pitmen at each end of said crank, on each side of the Machine is horizontally attached to said crank and to the top ends of said levers. The other two of said pitmen are attached perpendicularly to said crank, and to the front or perpendicular knife in front of the aforesaid tie or brace. To the lower end of each of the aforesaid levers is attached a movable arm standing in near end and horizontal to which is attached the rear, or horizontal knife below said tie or brace. Immediately above the movable arms in the lower end of said levers, is attached a feed hand and holder which operate operate on a ratchet wheel between the ends of the perpendicular
knife and each fender post. These ratchet wheels are at the ends of a
roller on which are placed two or more pinion wheels.
Above the back of the perpendicular knife to movable levers to the
aforesaid tie, or brace, resting on arms or fulcrums on the roller
aforesaid; at the front ends of said movable levers are attached
weights to cause said pinion wheels to hold fast, operate and
turn the log that is to be cut into Lath.
The log is placed between the fender posts by means of a horizontal
mandrel passing centrally through it, or by gudgeons at each end.
The carriage is formed of two inclined planes parallel, and one placed
near to each fender post, with cogs or teeth on the upper side of each of
said inclined planes; above which is placed the horizontal mandrel afore
said with cogs or teeth corresponding with those in the inclined planes
in which they operate to turn the log and to propel the carriage. These cogs
and teeth, and the angle of the inclined planes are so constructed that
by beginning at the foot or lower end of the plane and moving forwards
or upwards by means of the feed hands, ratchets, pinion wheels and cog
wheels aforesaid; that each revolution of the Mandrel and log will
raise the log on the inclined planes, or carriage the width of the lath.
When the Machine is put into operation by means of any power,
the turning of the aforesaid double crank causes the pitman attached
to the upper end of said levers to press outwards by which means the
rear or horizontal knife is forced inwards, and cuts the thickness
of a lath. The crank continuing to turn operates on the perpen-
dicular pitman and forces the perpendicular knife downwards
and cuts the width of a lath, and by these two operations cutting
a lath entirely out of the log, and by the turning of the double crank
and the operation of the feed hands on the ratchet wheels, the pinion
roller turns the log, which turns the mandrel and moves the
carriage up the thickness of a lath, and then the knives operate as
aforesaid, and so on until the log is entirely cut into lath.

Witnesses
W. Sellers
[illegible]

James Mead
[illegible]
[illegible]

Drawing Made

744